(12) United States Patent
Cagle et al.

(10) Patent No.: US 10,131,807 B2
(45) Date of Patent: Nov. 20, 2018

(54) DIMERIC FLUOROSURFACTANTS FOR INK-JET INKS

(71) Applicant: Hewlett-Packard Development Company, L.P., Fort Collins, CO (US)

(72) Inventors: Phillip C. Cagle, San Diego, CA (US); Sergiy Peleshanko, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/690,985

(22) Filed: Aug. 30, 2017

(65) Prior Publication Data

US 2017/0369726 A1 Dec. 28, 2017

Related U.S. Application Data

(62) Division of application No. 14/426,631, filed as application No. PCT/US2012/055662 on Sep. 14, 2012, now Pat. No. 9,783,692.

(51) Int. Cl.
   C09D 11/38 (2014.01)
   C09D 11/40 (2014.01)
   C09D 11/54 (2014.01)

(52) U.S. Cl.
   CPC .............. *C09D 11/38* (2013.01); *C09D 11/40* (2013.01); *C09D 11/54* (2013.01)

(58) Field of Classification Search
   CPC .......... C09D 11/38; C09D 11/40; C09D 11/54
   USPC ............................................ 106/31.59, 31.89
   See application file for complete search history.

(56) References Cited

U.S. PATENT DOCUMENTS

| | | | |
|---|---|---|---|
| 5,035,841 A | 7/1991 | Costello et al. | |
| 5,852,075 A | 12/1998 | Held | |
| 6,087,416 A | 7/2000 | Pearlstine et al. | |
| 6,444,017 B1 | 9/2002 | Yue et al. | |
| 6,848,777 B2 | 2/2005 | Chen et al. | |
| 7,635,504 B2 | 12/2009 | Elwakil et al. | |
| 7,696,262 B2 * | 4/2010 | Cagle | C09D 11/38 523/160 |
| 7,812,065 B2 | 10/2010 | Bublewitz et al. | |
| 8,783,842 B2 * | 7/2014 | Ingle | B41J 2/21 347/100 |
| 9,683,120 B2 * | 6/2017 | Cagle, Jr. | C09D 11/54 |
| 9,732,244 B2 * | 8/2017 | Ingle, Jr. | C09D 11/38 |
| 9,783,692 B2 * | 10/2017 | Cagle | C09D 11/38 |
| 2003/0083396 A1 | 5/2003 | Ylitalo et al. | |
| 2006/0007287 A1 | 1/2006 | Cagle et al. | |
| 2007/0084380 A1 * | 4/2007 | Cagle | C09D 11/322 106/31.6 |
| 2007/0139476 A1 | 6/2007 | Schwartz et al. | |
| 2007/0229636 A1 * | 10/2007 | Mubarekyan | C09D 11/54 347/100 |
| 2008/0024575 A1 | 1/2008 | Yue et al. | |
| 2008/0070008 A1 * | 3/2008 | Namba | C09D 11/38 106/31.13 |
| 2008/0188595 A1 | 8/2008 | Deardurff | |
| 2010/0227067 A1 * | 9/2010 | Namba | C09D 11/38 106/31.89 |
| 2010/0292372 A1 | 11/2010 | Gardner et al. | |
| 2012/0314000 A1 * | 12/2012 | Sarkisian | C09D 11/54 347/21 |
| 2013/0076842 A1 * | 3/2013 | Sarkisian | C09D 11/54 347/100 |
| 2014/0118449 A1 * | 5/2014 | Sarkisian | C09D 11/54 347/101 |
| 2015/0225587 A1 * | 8/2015 | Cagle | C09D 11/38 106/31.13 |

FOREIGN PATENT DOCUMENTS

| | | |
|---|---|---|
| CN | 1537149 | 10/2004 |
| CN | 101048469 | 10/2007 |
| CN | 101547981 | 9/2009 |
| CN | 101848971 | 9/2010 |

OTHER PUBLICATIONS

International Search Report and Written Opinion dated Mar. 26, 2013 for International Application No. PCT/US2012/055662 filed Sep. 14, 2012, Applicant Hewlett-Packard Development Company, L.P. et al.

* cited by examiner

*Primary Examiner* — Helene Klemanski
(74) *Attorney, Agent, or Firm* — Thorpe North & Western LLP

(57) ABSTRACT

The present disclosure provides ink-jet inks incorporating dimeric fluorosurfactants. As such, an ink-jet ink can include a liquid vehicle; a non-ionic fluorosurfactant dimer having the structure $CF_3(CF_2)_x(CH_2)_y(CR_2CR_2O)_z$-A-$(OCR_2CR_2)_a(CH_2)_b(CF_2)_cCF_3$, where R is independently H or methyl, A is a bridging unit containing aliphatic or aromatic functionality, x is 3 to 18, y is 0 to 8, z is 0 to 100, a is 0 to 100, b is 0 to 8, and c is 3 to 18; and a polymer.

20 Claims, No Drawings

DIMERIC FLUOROSURFACTANTS FOR INK-JET INKS

The present application is a divisional application of U.S. patent application Ser. No. 14/246,631, filed on Mar. 6, 2015, now U.S. Pat. No. 9,783,692, which is a U.S. National Stage Application under 35 U.S.C. 371 of PCT/US2012/055662, filed on Sep. 14, 2012, each of which is incorporated herein by reference.

BACKGROUND

Digital inkjet printing of signs and other graphic arts applications is increasingly replacing screen printing and other analog printing technologies. Digital inks for large format printing should provide good image quality, durability, and permanence. While many of the inks in use are solvent-based, in recent years efforts have been made to replace organic solvent-based inks with water-based inks. However, many of the media substrates are nonporous coated papers or polymer films such as vinyl, which presents challenges with respect to water-based inks.

More specifically, nonporous media present wetting and image quality control issues for aqueous inks due to a combination of low media surface energies and low porosity. On nonporous media, droplet coalescence and subsequent ink flow leads to image quality defects, such as intercolor bleeding and mottled area fill non-uniformities. Various surfactant additives have been used previously in order to effectively wet low surface energy media and control image quality defects, such as color-to-color bleed and area fill mottle. These additives are used in an attempt to provide desired wetting properties and to perform well in a high-speed thermal or piezo printhead.

Materials that have been used include nonionic fluorosurfactants with perfluorinated chains of C8 or larger, but these materials are increasingly being replaced with short-chain analogs due to stewardship concerns (C6 or lower). One drawback of the short-chain materials is that the lower hydrophobicity typically provides poorer wetting and image quality control in inkjet printing than traditional longer-chain perfluorinated materials, and this ultimately limits the throughput of high-speed inkjet printing. Thus, the development of specific additives and ink formulations that improve image quality control would be an advancement in the art.

DETAILED DESCRIPTION

It has been recognized that traditional fluorosurfactants can be replaced with non-ionic fluorosurfactant dimers to provide excellent bleed and coalescence while maintaining good printhead operability and colloidal stability of the ink. As such, the present disclosure is directed to modifications of nonionic fluorosurfactants (FS—OH) where FS—OH refers to a general fluorosurfactant structure (FS) with hydroxyl (OH) functionality. Specifically, such FS—OH compounds can be modified with difunctional aliphatic or aromatic isocyanates to make dimeric addition compounds that provide enhancements in image quality when incorporated into an inkjet ink. The following scheme provides the general reaction to form the dimeric structure:

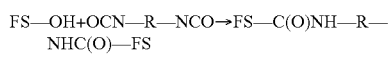

where R is an aliphatic or aromatic group.

It is noted that when discussing the present compositions, inks, and methods, each of these discussions can be considered applicable to the other of these embodiments, whether or not they are explicitly discussed in the context of that embodiment. Thus, for example, in discussing a bridging group in an ink-jet ink having a non-ionic fluorosurfactant dimer, such a bridging group can also be used in a method of making a non-ionic fluorosurfactant dimer, and vice versa.

The present dimeric fluorosurfactants provide improved image quality in inkjet ink formulations while maintaining good printhead operability and colloidal stability of the ink.

Non-ionic fluorosurfactant dimer compositions and associated methods described herein can include a non-ionic fluorosurfactant dimer having the following structure:

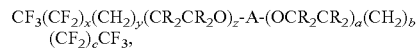

where R is independently H or methyl, A is a bridging unit containing aliphatic or aromatic functionality, x is 3 to 18, y is 0 to 8, z is 0 to 100, a is 0 to 100, b is 0 to 8, and c is 3 to 18. In one example, x and c can independently be 3 to 5, y and b can independently be 0 to 4, and z and a can independently be 0 to 25. In one aspect, y and b and z and a can be at least 1. In another example, a+b+y+z is at least two. In one aspect, x and c can be the same, y and b can be the same, and/or z and a can be the same. In one specific aspect, x and c can be 5. In one example, the bridging unit containing aliphatic or aromatic functionality can contain 1 to 100 carbons atoms; i.e. C1 to C100. In one aspect, the bridging unit containing aliphatic or aromatic functionality can be a C1 to C50.

Generally, monomer starting materials used to prepare the dimeric addition compounds are nonionic fluorosurfactants of the structure $CF_3(CF_2)_x(CH_2)_y(CR_2CR_2O)_zH$, where R is independently H or methyl, x is 3 to 18, y is 0 to 8, and z is 0 to 100.

Such monomer starting materials include nonionic fluorosurfactants such as, but not limited to, S550-100 or S550 (Chemguard), S222N (Chemguard), S559-100 or S559 (Chemguard), Capstone® FS-31 (DuPont™) Capstone® FS-35 (DuPont™), Capstone® FS-34 (DuPont™), Capstone® FS-30 (Dupont™), Capstone® FS-3100 (DuPont™), Masurf® FS-2950 (Mason), Masurf® FS-3240 (Mason), Masurf® FS-2900 (Mason), Masurf® FS-2825 (Mason), Masurf® FS-1700 (Mason), Masurf® FS-1800 (Mason), and Megaface 550 (DIC), or mixtures thereof. Starting materials can be treated prior to reaction with the isocyanate bridging unit to remove water and/or hydroxylic solvents by drying or other methods known to those in the art.

Bridging groups can be derived from difunctional isocyanates, although other chemistries can be envisioned. Suitable diisocyanates for the bridging group A include those represented by the formula $R(NCO)_2$, where R represents an organic group having a molecular weight of about 120 to 400. In one example, the diisocyanates can include those in which R represents a divalent aliphatic hydrocarbon group having 4 to 10 carbon atoms, a divalent cycloaliphatic hydrocarbon group having 5 to 15 carbon atoms, a divalent arylaliphatic hydrocarbon group having 7 to 15 carbon atoms, or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene, and mixtures thereof.

Dimeric addition compounds prepared from nonionic fluorosurfactant monomers (B) and dimeric isocyanate-derived bridging groups (A) can include or consist of the following homo and hetero combinations of monomer(s) and bridging groups(s), or blends of monomer and dimer:
i) dimers with a single bridging group: BAB;
ii) blends of dimers with multiple bridging groups: BAB+ BA'B, where A' is a different bridge than A;
iii) heterodimers with multiple monomer groups: BAB', where B' is a different monomer than B; and
iv) blends of monomer and dimer, including mixtures of combinations in i-iii: B+BAB (or B'+BAB).

The present disclosure also relates to the use of the dimeric fluorosurfactants in inkjet ink formulations. With the above in mind, an ink-jet ink can include a liquid vehicle; a non-ionic fluorosurfactant as disclosed herein, including the monomer/dimer blends of the type defined in i-iv above; and a colorant.

While the amount of fluorosurfactant monomer/dimer blend present in any particular composition can vary, in one example, the non-ionic fluorosurfactant dimer can be present in an ink-jet ink at a concentration from 0.01 wt % to 5 wt %, and the monomeric fluorosurfactant can be present in a concentration from 0 wt % to 4.99 wt %, where the total of monomer+dimer is from 0.01 w % to 5 wt %. In one aspect, the combination of non-ionic fluorosurfactant dimer and monomer can be present in an ink-jet ink at a concentration from 0.1 wt % to 2.5 wt %.

As used herein, "liquid vehicle" or "ink vehicle" refers to the liquid fluid in which a fluorosurfactant dimer is placed to form an ink. In one example, the ink can also include a colorant. Ink vehicles are well known in the art, and a wide variety of ink vehicles may be used with the systems and methods of the present invention. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc. Additionally, the term "aqueous liquid vehicle" or "aqueous vehicle" refers to a liquid vehicle including water as a solvent. In one aspect, water can include a majority of the liquid vehicle.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

In addition to the above ink-jet inks, the present disclosure provides an ink-jet ink including: a liquid vehicle; a non-ionic fluorosurfactant dimer having the structure $CF_3(CF_2)_x(CH_2)_y(CR_2CR_2O)_z$-A-$(OCR_2CR_2)_a(CH_2)_b(CF_2)_cCF_3$, where R is independently H or methyl, A is a bridging group containing aliphatic or aromatic functionality, x is 3 to 18, y is 0 to 8, z is 0 to 100, a is 0 to 100, b is 0 to 8, and c is 3 to 18; and a polymer. Notably, the present ink-jet ink does not require a colorant. As such, the present ink-jet ink can be used as a separate pretreatment composition that is printed with an ink composition to improve image properties. In one example, the polymer can be a fixer polymer, e.g., a cationic polymer. As used herein, "fixer polymer" refers to a polymer having an ionic charge opposite that of a colorant such that the colorant binds to or otherwise becomes associated with the polymer sufficient to immobilize the colorant on the printed image upon contact with the polymer. In another example, the polymer can be a latex. As used herein, "latex" or "latex particulate" refers to discrete polymeric masses dispersed in a fluid, e.g., water. In still another aspect, the ink-jet ink pretreatment can include a multivalent salt, e.g. calcium nitrate, for use as a fixing agent.

The monomers used in the latexes can be vinyl monomers. As such, the monomers can be selected from the group of vinyl monomers, acrylate monomers, methacrylate monomers, styrene monomers, combinations thereof, and mixtures thereof.

In one example, the monomers can be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one aspect, the monomers can include acrylates, methacrylates, and styrenes. Additionally, the monomers can include hydrophilic monomers including acid monomers, and hydrophobic monomers.

Monomers that can be polymerized in forming the latex particulates include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam combinations thereof, derivatives thereof, and mixtures thereof.

Acidic monomers that can be polymerized in forming the latex particulates include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Regarding the latex particulates, the latexes can have various particle sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 200,000 to 300,000.

Further, the average particle diameter of the latex particles can be from about 10 nm to about 1 μm; in some other examples, from about 10 nm to about 500 nm; and, in yet other examples, from about 100 nm to about 300 nm. The particle size distribution of the latex is not particularly limited, and either latex having a broad particle size distribution or latex having a mono-dispersed particle size distribution may be used. It is also possible to use two or more kinds of latex particles each having a mono-dispersed particle size distribution in combination.

The ink-jet ink and other compositions of the present disclosure can also be suitable for use on many types of substrates of recording media, including but not limited to, paper media and nonporous media. In one example, the substrate can be nonporous vinyl media.

Typical ink vehicle formulations described herein can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant or the latex, the balance of the formulation can be purified water, or other vehicle components known in the art, such as biocides, viscosity modifiers, materials for pH adjustment, sequestering agents, preservatives, and the like.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

In addition to the above, a method of manufacturing an ink-jet ink can include admixing a colorant and a nonionic fluorosurfactant into a liquid vehicle; wherein the non-ionic fluorosurfactant dimer includes any of those described herein including having the structure $CF_3(CF_2)_x(CH_2)_y(CR_2CR_2O)_z\text{-A-}(OCR_2CR_2)_a(CH_2)_b(CF_2)_cCF_3$, where R is independently H or methyl, A is a bridging unit containing aliphatic or aromatic functionality, x is 3 to 18, y is 0 to 8, z is 0 to 100, a is 0 to 100, b is 0 to 8, and c is 3 to 18. In one example, the method can further include admixing a latex into the liquid vehicle.

Further, in addition to the non-ionic fluorosurfactant dimers described herein, the present disclosure provides for methods of making such dimers relating thereto. Generally, a method of manufacturing a non-ionic fluorosurfactant dimer(s) can include reacting a monomer or mixture of monomers with a diisocyanate or mixture of diisocyanates to form the non-ionic fluorosurfactant dimer(s). Such materials can be reacted to form the blends of monomer/dimers as discussed herein, depending on the reaction stoichiometry.

The non-ionic fluorosurfactant dimers can be generally manufactured from reacting their respective alcohol monomers with a difunctional molecule to form dimers. As such, the monomers can be chosen to provide symmetric and asymmetric dimers as previously discussed.

In one example, a method of manufacturing a non-ionic fluorosurfactant dimer can include reacting a first monomer having the structure $CF_3(CF_2)_x(CH_2)_y(CR_2CR_2O)_zH$ and a second monomer having the structure $CF_3(CF_2)_c(CH_2)_b(CR_2CR_2O)_aH$, where R is independently H or methyl, x is 3 to 18, y is 0 to 8, z is 0 to 100, a is 0 to 100, b is 0 to 8, and c is 3 to 18 with a difunctional molecule having the structure $R(NCO)_2$ where R is an organic group having a molecular weight of about 120 to 400. The reaction is carried out to form the non-ionic fluorosurfactant dimer with the structure $CF_3(CF_2)_x(CH_2)_y(CR_2CR_2O)_z\text{-A-}(OCR_2CR_2)_a(CH_2)_b(CF_2)_cCF_3$, where R is independently H or methyl, A is a bridging group containing aliphatic or aromatic functionality, x is 3 to 18, y is 0 to 8, z is 0 to 100, a is 0 to 100, b is 0 to 8, and c is 3 to 18.

In one aspect, the difunctional molecule can be an alkyl diisocyanate. In one specific aspect, the diisocyanate can be 1,6-hexamethylenediisocyanate. As such, upon reacting with the monomers, the difunctional molecule can provide a bridging group that includes an amide group.

Regarding the present method steps, such steps can be performed in a number of sequences and are not intended to be limited to the order written. For example, the second monomer can be reacted with the difunctional molecule before the first monomer is reacted with the difunctional monomer, and vice versa. Additionally, it is noted that any and all combinations of such steps or individual step may be performed sequentially or simultaneously. For example, reacting the first monomer with the difunctional monomer and reacting the second monomer with the difunctional monomer may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present ink-jet ink compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present ink set compositions and methods have been described above with particularity, the following examples provide further detail in connection with what are presently deemed to be the acceptable embodiments.

Example 1—Fluorosurfactant Dimer Preparation

A 3-neck flask was charged with Chemguard S550-100 fluorosurfactant (59.62 g, dried over 4 Å molecular sieves). The flask was equipped with a mechanical stirrer, temperature probe, and a nitrogen bubbler and stirred under nitrogen for one hour. 1,6-hexamethylene diisocyanate (4.0 g, Fluka >98%) was added dropwise with stirring. Dibutyltindilaurate (0.05 g, Sigma-Aldrich) was added, and the flask was fitted with a heating mantle. The clear yellow solution was heated to 65° C., accompanied by a slight exotherm to 77° C. and the appearance of turbidity. The resulting mixture was stirred for 7 hours at 65° C., and then left 14 hours at room temperature. Deionized water (1.2 g) was added dropwise, and the mixture was heated to 65° C. Additional deionized water (130 g) was added, giving a yellow slurry. After six hours, the material was cooled and rinsed from the flask with deionized water (100 g). After sitting 10 days, a viscous yellow solution was obtained. Yield: 280 g (22% solids). NCO content: none detectable. Surface tension of 0.1 wt % solution in water was 18.3 vs. 17.0 dynes/cm for the starting material.

LC/MS analysis confirmed the presence of monomer, dimer, and other (from the starting material). (LTQ-Orbitrap LC-MSn system. MS to MS4 data were collected for the peak identifications. The LC column was an Agilent Eclipse Plus C18, 50 mm×2.1 mm, particle size 1.8 μm.) LC/ELSD analysis quantified that 43:50:7 blend of monomer:dimer: polyethylene glycol was obtained. (Agilent 1100 LC system with AllTech 2000 evaporative light scattering detector. The LC column was an Agilent Eclipse Plus C18, 50 mm×2.1 mm, particle size 1.8 μm).

Example 2—Pretreatment Preparation

A pretreatment composition was prepared by admixing the fluorosurfactant dimer of Example 1 with a liquid vehicle and cationic polymer according to Table 1. The measured surface tension was 19.6 dynes/cm.

TABLE 1

| Compositional Elements | Pretreatment (g) |
|---|---|
| 2-Pyrrolidinone | 33.7 |
| MPDiol | 18.2 |
| Non-ionic surfactant | 2 |
| Cationic Polymer (55% solution) | 8.8 |
| Fluorosurfactant Dimer Blend from Example 1 | 3.7 |
| Deionized Water | 133.6 |

Example 3—Ink-Jet Ink Preparation

Three KCMYcm ink sets were formulated. A first ink set having the fluorosurfactant dimer blend of Example 1 was prepared according to Tables 2 and 3A, a second ink set having the fluorosurfactant dimer blend of Example 1 with a fluorosurfactant was prepared according to Tables 2 and 3B, and a comparative ink set having the fluorosurfactant monomer of Example 1 with a fluorosurfactant was prepared according to Tables 2 and 3C. The ink-jet inks were prepared according to the compositional elements and amounts (in grams) listed in Tables 2 and 3A-C.

TABLE 2

| Component | Black (g) | Cyan (g) | Magenta (g) | Yellow (g) | Light Magenta (g) | Light Cyan (g) |
|---|---|---|---|---|---|---|
| Magenta Pigment Dispersion | — | — | 42.8 | — | 10.7 | — |
| Black Pigment | 20.0 | — | — | — | — | — |

TABLE 2-continued

| Component | Black (g) | Cyan (g) | Magenta (g) | Yellow (g) | Light Magenta (g) | Light Cyan (g) |
|---|---|---|---|---|---|---|
| Dispersion | | | | | | |
| Cyan Pigment Dispersion | — | 14.9 | — | — | — | 3.7 |
| Yellow Pigment Dispersion | — | — | — | 29.1 | — | — |
| Acrylic Latex Dispersion | 32.8 | 32.8 | 32.8 | 32.8 | 18.7 | 18.7 |
| Wax Dispersion | 4.0 | 4.0 | 4.0 | 4.0 | 2.5 | 2.5 |
| 2-pyrrolidinone | 29.5 | 30.5 | 33.7 | 33.7 | 33.7 | 32.9 |
| MPDiol | 18.2 | 18.2 | 16.0 | 16.7 | 17.6 | 18.2 |
| Anionic Surfactant | 0.4 | 0.4 | 0.4 | 0.4 | 0.4 | 0.4 |
| Nonionic Surfactant | 3.6 | 3.6 | 3.6 | 3.6 | 3.6 | 3.6 |
| Acrylic Polymer Solution | — | — | — | — | 3.3 | 2.7 |
| Chelating Agent | 0.5 | 0.5 | 0.5 | 0.5 | 0.5 | 0.5 |
| Chemguard S550-100 | Var | Var | Var | Var | Var | Var |
| Example 1 | Var | Var | Var | Var | Var | Var |
| DI Water | Bal | Bal | Bal | Bal | Bal | Bal |
| Total | 200 | 200 | 200 | 200 | 200 | 200 |

MPDiol is 2-methyl-1,3-propanediol
Var is variable; i.e., providing the amounts listed in Tables 3A-C
Bal is balance of grams up to 200 g Tables 3A-C: Ink Sets with surfactant amounts, estimated monomer/dimer ratios, and surface tensions

TABLE 3A

| Ink Set 1 (Higher Dimer) | Black | Cyan | Magenta | Yellow | Light Magenta | Light Cyan |
|---|---|---|---|---|---|---|
| Example 1 (wt %) | 0.4 | 0.5 | 0.9 | 0.8 | 0.6 | 0.5 |
| Chemguard S550-100 (wt %) | — | — | — | — | — | — |
| Monomer (wt %) (calculated) | 0.2 | 0.2 | 0.4 | 0.3 | 0.3 | 0.2 |
| Dimer (wt %) (calculated) | 0.2 | 0.3 | 0.4 | 0.4 | 0.3 | 0.3 |
| Surface Tension (dynes/cm) | 20.9 | 20.2 | 20.0 | 20.0 | 20.2 | 20.3 |

TABLE 3B

| Ink Set 2 (Lower Dimer) | Black | Cyan | Magenta | Yellow | Light Magenta | Light Cyan |
|---|---|---|---|---|---|---|
| Example 1 (wt %) | 0.2 | 0.3 | 0.5 | 0.5 | 0.4 | 0.3 |
| Chemguard S550-100 (wt %) | 0.1 | 0.2 | 0.3 | 0.3 | 0.2 | 0.2 |
| Monomer (wt %) (calculated) | 0.2 | 0.3 | 0.5 | 0.5 | 0.4 | 0.3 |
| Dimer (wt %) (calculated) | 0.1 | 0.2 | 0.3 | 0.2 | 0.2 | 0.2 |
| Surface Tension (dynes/cm) | 20.8 | 20.5 | 20.0 | 20.2 | 20.3 | 20.4 |

TABLE 3C

| Ink Set 3 (Higher Dimer) | Black | Cyan | Magenta | Yellow | Light Magenta | Light Cyan |
|---|---|---|---|---|---|---|
| Example 1 (wt %) | — | — | — | — | — | — |
| Chemguard S550-100 (wt %) | 0.4 | 0.5 | 0.9 | 0.8 | 0.6 | 0.5 |
| Monomer (wt %) (calculated) | 0.3 | 0.5 | 0.8 | 0.7 | 0.6 | 0.5 |
| Dimer (wt %) (calculated) | — | — | — | — | — | — |
| Surface Tension (dynes/cm) | 22.2 | 21.2 | 20.4 | 20.8 | 20.8 | 20.4 |

Example 4—Data

The ink sets of Example 3 were printed on a modified HP L25500 printer equipped with a heating system onto Avery MP13100 self-adhesive vinyl, followed by curing in the printer at 95° C.

Color combinations of various colors and color densities were printed and assessed for visual print quality under two conditions:

Test 1: the samples were printed at a printer printzone setpoint of 55° C. without pretreatment. All ink sets printed well, with good image quality and print reliability over multiple plots. Samples were visually graded for area fill uniformity. Qualitative grading criteria including mottle (light/dark density variations) and pinhole defects from non-uniform wetting of the media. The overall rank of the samples for area fill uniformity was set 1 (higher dimer) >set 2 (lower dimer) >set 3 (no dimer).

Test 2: samples were printed at a printzone temperature of 25° C. along with an underprinted pretreatment fluid from Example 2. The inks and pretreatment printed well, with good print reliability. The overall print quality was dependent on the amount of underprinted pretreatment, which was adjusted in the image as a ratio of the total ink density: Samples were visually graded for area fill uniformity as a function of pretreatment. Qualitative grading criteria including mottle (light/dark density variations) and pinhole defects from non-uniform wetting of the media. The overall rank of the samples for area fill uniformity was set 1 (higher dimer) >set 2 (lower dimer) >set 3 (no dimer). Sets 1 and 2 were shown to control image quality defects using lower amounts of pretreatment than Set 3.

The results in test 1 and test 2 show that the presence of a dimeric fluorosurfactant in an inkjet ink improved the image quality over the monomeric fluorosurfactant.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An ink-jet ink, comprising:
   a liquid vehicle;
   a non-ionic fluorosurfactant dimer having the structure $CF_3(CF_2)_x(CH_2)_y(CR_2CR_2O)_z$-A-$(OCR_2CR_2)_a(CH_2)_b(CF_2)_cCF_3$, where R is independently H or methyl, A is a bridging unit containing aliphatic or aromatic functionality, x is 3 to 18, y is 0 to 8, z is 0 to 100, a is 0 to 100, b is 0 to 8, and c is 3 to 18; and
   a cationic polymer.

2. The ink-jet ink of claim 1, wherein x and c are independently 3 to 5, y and b are independently 0 to 4, and z and a are independently 0 to 25.

3. The ink-jet ink of claim 1, wherein the cationic polymer is a latex polymer.

4. The ink jet ink of claim 1, wherein the non-ionic fluorosurfactant dimer is present in the ink-jet ink at a concentration from 0.01 wt % to 5 wt %.

5. The ink jet ink of claim 1, wherein the non-ionic fluorosurfactant dimer is selected from the group consisting of a dimer with a single bridging group having the structure BAB; a blend of two dimers with multiple bridging groups having the structure: BAB+BA'B; a heterodimer with multiple monomer groups having the structure: BAB'; and a blend of a monomer and a dimer having the structure: B+BAB or B'+BAB; wherein B is a monomer, B' is a monomer that is different than B, A is the bridging group, and A' is a bridging group that is different than A.

6. The ink-jet ink of claim 1, wherein x and c are the same, y and b are the same, or z and a are the same.

7. The ink-jet ink of claim 1, wherein y and b are the same.

8. The ink-jet ink of claim 1, wherein z and a are the same.

9. The ink-jet ink of claim 1, wherein y and b are the same or z and a are the same.

10. The ink-jet ink of claim 1, comprising from 0.1 wt % to 40 wt % of a co-solvent.

11. The ink-jet ink of claim 1, wherein x is 5.

12. The ink-jet ink of claim 1, wherein z is 5.

13. The ink-jet ink of claim 1, wherein x is 5 and z is 5.

14. An ink-jet ink, comprising:
   a liquid vehicle;
   a non-ionic fluorosurfactant dimer having the structure
   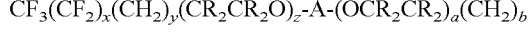
   $(CF_2)_c CF_3$, where R is independently H or methyl, A is a bridging unit containing aliphatic or aromatic functionality, x is 3 to 18, y is 0 to 8, z is 0 to 100, a is 0 to 100, b is 0 to 8, and c is 3 to 18, with the proviso that one of x or z is 5; and
   a polymer.

15. The ink-jet ink of claim 14, wherein the non-ionic fluorosurfactant dimer is present in the ink-jet ink at a concentration from 0.01 wt % to 5 wt %.

16. The ink-jet ink of claim 14, the non-ionic fluorosurfactant dimer is selected from the group consisting of a dimer with a single bridging group having the structure BAB; a blend of two dimers with multiple bridging groups having the structure: BAB+BA'B; a heterodimer with multiple monomer groups having the structure: BAB'; and a blend of a monomer and a dimer having the structure: B+BAB or B'+BAB; wherein B is a monomer, B' is a monomer that is different than B, A is the bridging group, and A' is a bridging group that is different than A.

17. The ink-jet ink of claim 14, wherein x and c are the same, y and b are the same, or z and a are the same.

18. The ink-jet ink of claim 14, wherein x and c are independently 3 to 5, y and b are independently 0 to 4, and a is 0 to 25.

19. The ink-jet ink of claim 14, wherein x is 5.

20. The ink-jet ink of claim 14, wherein z is 5.

* * * * *

UNITED STATES PATENT AND TRADEMARK OFFICE
CERTIFICATE OF CORRECTION

PATENT NO. : 10,131,807 B2
APPLICATION NO. : 15/690985
DATED : November 20, 2018
INVENTOR(S) : Phillip C. Cagle et al.

Page 1 of 1

It is certified that error appears in the above-identified patent and that said Letters Patent is hereby corrected as shown below:

In the Specification

In Column 1, Line 5, delete "14/246,631" and insert -- 14/426,631 --, therefor.

In the Claims

In Column 11, Claim 4, Line 1, delete "ink jet" and insert -- ink-jet --, therefor.

In Column 11, Claim 5, Line 4, delete "ink jet" and insert -- ink-jet --, therefor.

Signed and Sealed this
Ninth Day of April, 2019

Andrei Iancu
*Director of the United States Patent and Trademark Office*